United States Patent [19]

Smith

[11] Patent Number: 4,646,262

[45] Date of Patent: Feb. 24, 1987

[54] FEEDBACK VECTOR GENERATOR FOR STORAGE OF DATA AT A SELECTABLE RATE

[75] Inventor: David M. Smith, Saratoga, Calif.

[73] Assignee: Ramtek Corporation, Santa Clara, Calif.

[21] Appl. No.: 821,742

[22] Filed: Jan. 23, 1986

Related U.S. Application Data

[63] Continuation of Ser. No. 515,946, Jul. 20, 1983, abandoned.

[51] Int. Cl.[4] .......... G06F 9/20

[52] U.S. Cl. .......... 364/900; 364/521

[58] Field of Search .......... 364/200, 900

[56] References Cited

U.S. PATENT DOCUMENTS

| | | | |
|---|---|---|---|
| 3,649,819 | 3/1972 | Waller | 364/521 |
| 3,893,075 | 7/1975 | Orban et al. | 364/900 |
| 3,895,357 | 7/1975 | Schwartz et al. | 364/200 |
| 4,027,148 | 5/1977 | Rosenthal | 364/521 |
| 4,069,511 | 1/1978 | Lelke | 364/200 |
| 4,157,537 | 6/1979 | Cheek et al. | 364/521 |
| 4,254,467 | 3/1981 | Davis et al. | 364/521 |
| 4,407,016 | 9/1983 | Bayliss et al. | 364/200 |

*Primary Examiner*—Gareth D. Shaw
*Assistant Examiner*—Daniel K. Dorsey
*Attorney, Agent, or Firm*—Limbach, Limbach & Sutton

[57] ABSTRACT

A method and apparatus for writing a vector of data into a random access memory at high speed wherein the random access memory (RAM) is partitioned into blocks of addressable storage sites and wherein storage sites within each block are individually accessible. A vector generator provides addressing and storage site enabling signals to the RAM. Boundary detectors monitor the addressing and storage site selection signals to determine whenever storage sites within a new block of storage sites are sought to be addressed. When a boundary transition is detected, a control signal is provided to the vector generator which slows the operation of the vector generator for a period of time sufficient to permit the RAM to accept a new address. For all other addresses, the vector generator is permitted to operate at a higher speed wherein access to the RAM is made by way of enabling specific storage sites within the block of storage sites being written into.

8 Claims, 6 Drawing Figures

| ITERATION | $\nabla_i$ | Y: SCAN LINE ADDR | | | | | | | | | | BLOCK X: ADDR | | | | SITE ADDR WITHIN BLOCK | | | | | | | BOUNDARY DETECT | |
|---|---|---|---|---|---|---|---|---|---|---|---|---|---|---|---|---|---|---|---|---|---|---|---|---|
| | | BIT: 9 | 8 | 7 | 6 | 5 | 4 | 3 | 2 | 1 | 0 | 10 | 9 | 8 | 7 | 6 | 5 | 4 | 3 | 2 | 1 | 0 | X | Y |
| | | 0 | 0 | 0 | 0 | 1 | 1 | 1 | 1 | 1 | 0 | 0 | 0 | 0 | 0 | 1 | 1 | 1 | 0 | 1 | 0 | 1 | 0 | 0 |
| 1 | -2 | 0 | 0 | 0 | 0 | 1 | 1 | 1 | 1 | 1 | 0 | 0 | 0 | 0 | 0 | 1 | 1 | 1 | 0 | 1 | 1 | 0 | 0 | 0 |
| 2 | +4 | 0 | 0 | 0 | 0 | 1 | 1 | 1 | 1 | 1 | 1 | 0 | 0 | 0 | 0 | 1 | 1 | 1 | 0 | 1 | 1 | 1 | 0 | 1 |
| 3 | -6 | 0 | 0 | 0 | 0 | 1 | 1 | 1 | 1 | 1 | 1 | 0 | 0 | 0 | 0 | 1 | 1 | 1 | 1 | 0 | 0 | 0 | 0 | 0 |
| 4 | 0 | 0 | 0 | 0 | 1 | 0 | 0 | 0 | 0 | 0 | 0 | 0 | 0 | 0 | 0 | 1 | 1 | 1 | 1 | 0 | 0 | 1 | 0 | 1 |
| 5 | -10 | 0 | 0 | 0 | 1 | 0 | 0 | 0 | 0 | 0 | 0 | 0 | 0 | 0 | 1 | 0 | 0 | 0 | 0 | 0 | 0 | 0 | 1 | 0 |
| 6 | -4 | 0 | 0 | 0 | 1 | 0 | 0 | 0 | 0 | 0 | 0 | 0 | 0 | 0 | 1 | 0 | 0 | 0 | 0 | 0 | 0 | 1 | 0 | 0 |
| 7 | +2 | 0 | 0 | 0 | 1 | 0 | 0 | 0 | 0 | 0 | 1 | 0 | 0 | 0 | 1 | 0 | 0 | 0 | 0 | 0 | 1 | 0 | 0 | 1 |
| 8 | -8 | 0 | 0 | 0 | 1 | 0 | 0 | 0 | 0 | 0 | 1 | 0 | 0 | 0 | 1 | 0 | 0 | 0 | 0 | 0 | 1 | 1 | 0 | 0 |

FEEDBACK VECTOR GENERATOR FOR STORAGE OF DATA AT A SELECTABLE RATE

This is a continuation of application Ser. No. 515,946, filed July 20, 1983, now abandoned.

1. Technical Field

The present invention is, in general, directed to writing information into a random access memory and, more particularly, to a method and apparatus for writing a vector of data into a random access memory at high speed.

2. Background Art

In computer graphics systems, an image is produced on a visual display screen. The information by which this visual image is generated is stored in a screen refresh random access memory on a one-to-one or pixel-to-storage site basis. That is, for each pixel of the visual image display, there is a corresponding storage site in the random access memory (RAM) which contains data corresponding to and describing the visual information of that pixel. In order to display the information from the screen refresh RAM, the data from the screen refresh RAM are periodically read out on a line-by-line basis and displayed on a line-by-line basis in the visual display of the system. Typical of these displays are raster scanning devices such as high density television monitors which have a large number of horizontially displayed scan lines.

In order to write information into the screen refresh RAM, an X and a Y address are supplied to the RAM, along with the data to be written thereby. A write enable signal is supplied to the RAM to write the data into the addressed storage site. This process must be repeated for each storage site into which data are to be written. This entails supplying a different address for each different storage site being written into.

It is well-known that the speed at which these write operations can occur is limited by the RAM access time; i.e., the amount of time that the address and data are required to be present before the RAM can accurately respond to the information. It is also well-known that the speed by which data can be written into the RAM is limited by the speed at which the addressing of the RAM occurs.

The speed with which data can be written into a screen refresh RAM has a direct impact upon the performance of a graphics display system. For example, when extensive images are sought to be written into the screen refresh RAM, there will be a substantial time delay during which the write operation is being executed. In turn, this slows the operation of the entire system, as well as detracts from the operation of the system as a tool which assists in a design or display process.

BRIEF SUMMARY OF THE INVENTION

The foregoing problems of previous apparatus for writing data into a screen refresh RAM are overcome by the present invention of a method and apparatus for writing data into a screen refresh RAM at high speed, including a random access memory having a plurality of storage sites wherein the storage sites are addressable in blocks at a memory access rate. The storage sites within an accessed addressable block can be individually enabled at a write enable rate to receive data. An address generator provides the addressing for each block which is to be written into and the enable signal for the particular storage site within the accessed addressable block which is to receive the data. The rate of operation of the address generator is selectable between the memory access rate and the write enable rate. A control means is coupled to the address generator for selecting the rate of operation of the address generator according to the nature of the addresses being supplied by the address generator. Whenever addresses are supplied by the address generator for accessing a new addressable block, the control means cause the address generator to operate at the memory access rate for a predetermined period of time. After the predetermined period of time, the control means cause the address generator to resume operation at the write enable rate.

With the present invention the screen RAM is required to be addressed less frequently than the screen refresh RAM apparatus of the prior art. As used herein, a RAM access entails the application of an address on the RAM address lines, the receipt of or output of data on the RAM data lines, and the application of a write or a read enable signal on the RAM enable line. The RAM enable operation entails the application of the write or read enable signal to the RAM, it being assumed that the address and input data remain unchanged. Typically, the period of time required for a RAM access, such as a write operation, is longer than the period of time required for the RAM to be enabled, such as a write enable. Thus, with the above structure, a large proportion of the writing into or reading out of the storage sites in the RAM can be accomplished by enabling the appropriate storage site in the RAM. The number of storage sites within each block affect how frequently a RAM access operation will be required. Since the write enable signal is typically shorter than the RAM access time period, data can be written into the RAM at a higher speed for storage sites within a block. Thus, when the system is writing information within a block, the vector generator can operate at a speed which is comparable to the write enable speed requirement. When the storage site to be written into crosses a boundary between blocks or lies within a new block, the control means causes the address generator to slow down for a time period which satisfies the RAM access timing requirements. Thereafter, the control means permits the address generator to resume operation at the higher rate.

In order to implement the organization of storage sites into blocks in the preferred embodiment, a plurality of random access memories are addressed in common and receive data in common; however, each random access memory is supplied individually with a write enable signal. Thus, for a particular address, the corresponding storage site in each RAM for all of the RAMs collectively represent the block of storage sites corresponding to the address. When a write enable signal is supplied to a particular RAM, the data present on the data lines are written into that enabled RAM only, and only at the applied address.

In the preferred embodiment, the control means are implemented by circuitry which monitors the Y address for any changes therein, and the X address for any addresses which correspond to the end points of a block of storage sites. Upon the occurrence of either a change in the Y address or the addressing of an end point of a block, the circuitry supplies a delay signal or an inhibit signal to the address generator.

It is, therefore, an object of the present invention to provide a method and apparatus for writing data into a screen refresh RAM at high speed, wherein the screen refresh RAM includes storage sites which are accessable in addressable blocks, and wherein storage sites in an addressable block are individually enabled, and wherein addresses and write enable signals are supplied to the screen refresh RAM at a rate corresponding to the write enable rate of the screen refresh RAM, and further wherein circuitry is provided which slows the operation of the address generator for a predetermined period of time whenever a storage site within a different addressable block is being accessed.

It is another object of the present invention to provide a method and apparatus for writing data into a screen refresh RAM at high speed wherein storage sites within the refresh RAM are arranged in addressable blocks, and storage sites within an accessed addressable block can be enabled individually, and further wherein data are written into storage sites located within a given block at a rate corresponding to the write enable rate of the screen refresh RAM by operating an address generator at the write enable rate, and further wherein the operation of the address generator is slowed to the memory access rate of the screen refresh RAM whenever the next storage site to be written into is located in a different block of storage sites.

These and other objectives, features and advantages of the present invention will be more readily understood upon consideration of the following detailed description of the present invention, taken in conjunction with the accompanying drawings.

DETAILED DESCRIPTION OF THE INVENTION

Figure 1:
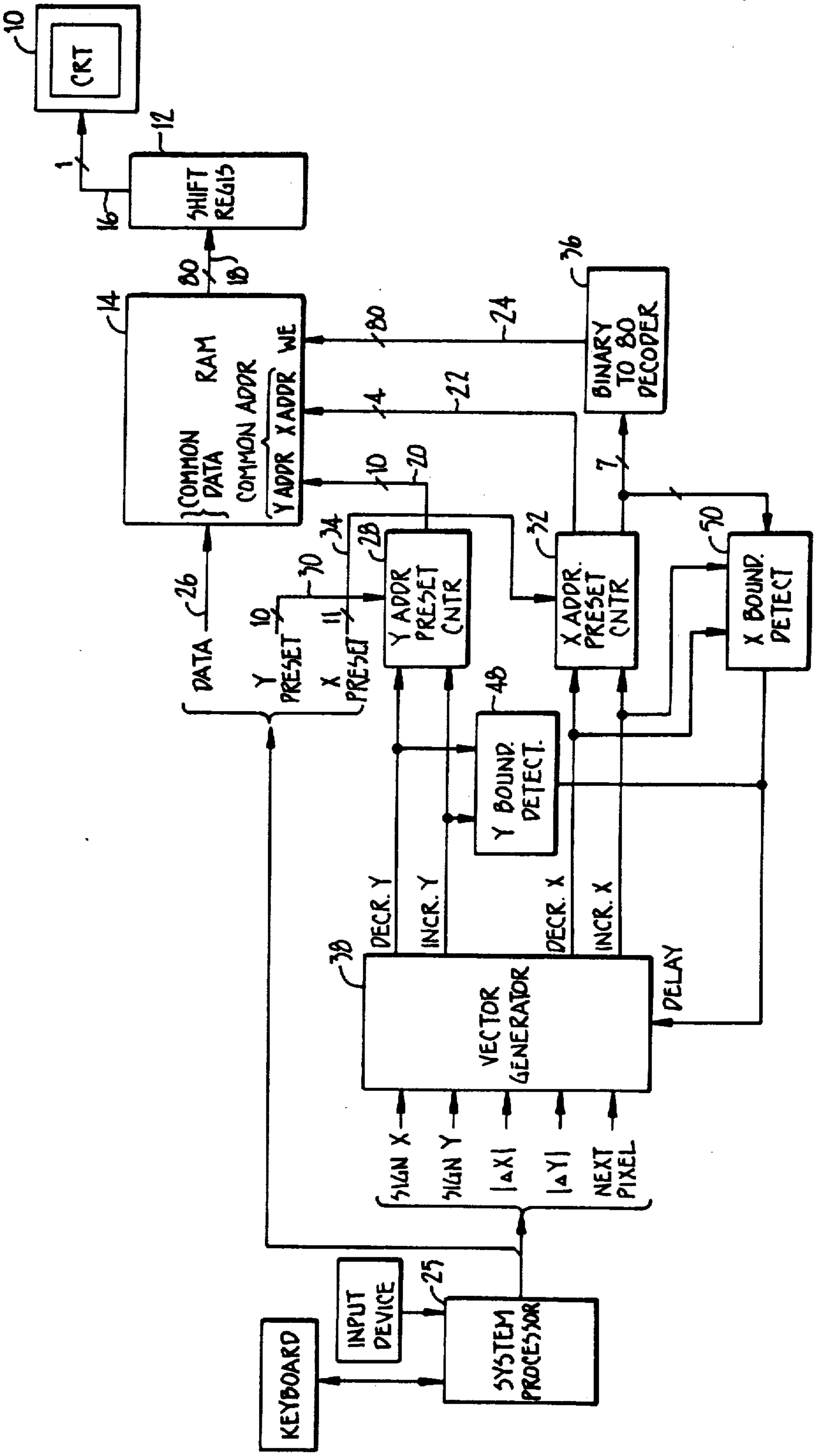
FIG. 1 is a simplified functional block diagram of the present invention.

Referring to FIG. 1, a visual display apparatus 10, such as a cathode ray tube, receives and displays information from a shift register 12 and screen refresh RAM 14 via line 16 and line 18. In the visual display shown, a resolution of 1,280×1024 pixels is provided, and a pixel is displayed at a rate of one pixel per ten nanoseconds. In the embodiment shown, shift register 12 receives 80 pieces of information from screen refresh RAM 14, in parallel, once every 800 nanoseconds. Shift register 12 thereafter shifts this information to visual display 10 via line 16 in a serial manner at a rate of one item of information per 10 nanoseconds. The addressing by which this transfer of information is controlled is generated by screen refresh RAM read circuitry, which is a part of the system processor 25.

It is to be understood that, in the typical video graphics system, each pixel of the video display 10 can have a number of different attributes. In order to specify these attributes, the data supplied to the visual display means 10 for each pixel includes a number of bits, i.e., a word of information. In order to provide these words of information, several planes of screen refresh RAM will be provided with corresponding shift registers, wherein each plane provides one bit of information for the word corresponding to a particular pixel. For purposes of simplifying the explanation of the present invention, only a single plane of screen refresh RAM will be discussed, it being understood that the discussion is equally applicable to multiple planes of screen refresh RAM.

In order to write information into screen refresh RAM 14, a Y address is supplied on line 20, an X address is supplied on line 22, and write enable signals are supplied on line 24. Data are supplied to screen refresh RAM 14 from the system processor 25 via line 26.

The Y address is supplied to line 20 by a Y address preset counter 28. The system processor 25 provides the preset information to Y address preset counter 28 via line 30.

The X address and information for the write enable signals are generated by X address preset counter 32. The preset X address is supplied from the system processor 25 via line 34. A portion of the X address generated by X address preset counter 32 is supplied to line 22 as the X address to screen refresh RAM 14, while the remainder of the address is provided to a binary-to-80 decoder 36. Binary-to-80 decoder decodes the address information from X address preset counter 32 to provide a signal on one of 80 lines which are collectively referenced as line 24. Y address preset counter 28 and X address preset counter 32 are incremented or decremented by commands from vector generator 38.

Vector generator 38 receives information from the system processor by which it generates the decrement and increment control signals to the Y address preset counter and the X address preset counter, and by which vectors of data can be written into screen refresh RAM 14. Typically, the system processor supplies the vector generator 38 with the following information: (1) the magnitude of the change in the X direction, (2) the magnitude of change in the Y direction, (3) the direction of change in the X direction, i.e., the sign of X, (4) the direction of change in the Y direction, i.e., the sign of Y, and (5) a command to generate the address for the next pixel of data.

From this information, the vector generator determines the optimal sequence of pixel addresses by which the vector can be generated, from the given starting point to an end point which is displaced from the starting point by the X and Y displacements specified, and in the directions specified. The Y preset and X preset information supplied to the Y address and X address preset counters 28 and 32, respectively, provide the starting point for the vector being generated. Therefore, the end point of the vector being generated is defined by the displacement and direction information from the system processor.

It is to be understood that there are numerous versions of vector generators in the prior art, and that any of these vector generators are suitable for use in the present invention so long as the vector generator is capable of providing addresses at a rate comparable to the write enable rate of the screen refresh RAM 14, and so long as the operation of the vector generator can be modified for a predetermined period of time to a lower rate of operation comparable to the access time for the screen refresh RAM 14. It is also to be understood that a vector generator which is suitable for use in the present invention can also be of the type which receives starting point and end point information and converts such information into addressing control signals.

A Y boundary detector 48 monitors the decrement Y and increment Y commands from vector generator 38 to Y address preset counter 28. Whenever a signal is detected on either line, Y boundary detector 48 provides a signal to the delay input of vector generator 38, which causes vector generator 38 to operate at the rate which corresponds to the access rate of the screen refresh RAM 14.

Similarly, X boundary detector 50 monitors certain of the lines from X address preset counter 32. The lines monitored specify the storage site within the block of storage sites being currently addressed. X boundary detector 50 also monitors the decrement X and increment X commands from vector generator 38 to X address preset counter 32. By doing so, the X boundary detector 50 can determine whether the storage sites being subsequently addressed will fall within a different block of storage sites. In other words, if the storage site currently being addressed is at one end of the block of storage sites, and if the command from vector generator 38 is to increment or decrement the address so that the next address will fall outside of the block being currently addressed, the X boundary detector 50 will provide a delay signal to the delay input of vector generator 38.

In the above manner, a feedback vector generator structure is provided by which the feedback generator can "look ahead" to determine whenever storage sites outside of the block currently being addressed will subsequently be addressed.

Screen Refresh RAM 14

Figure 2:
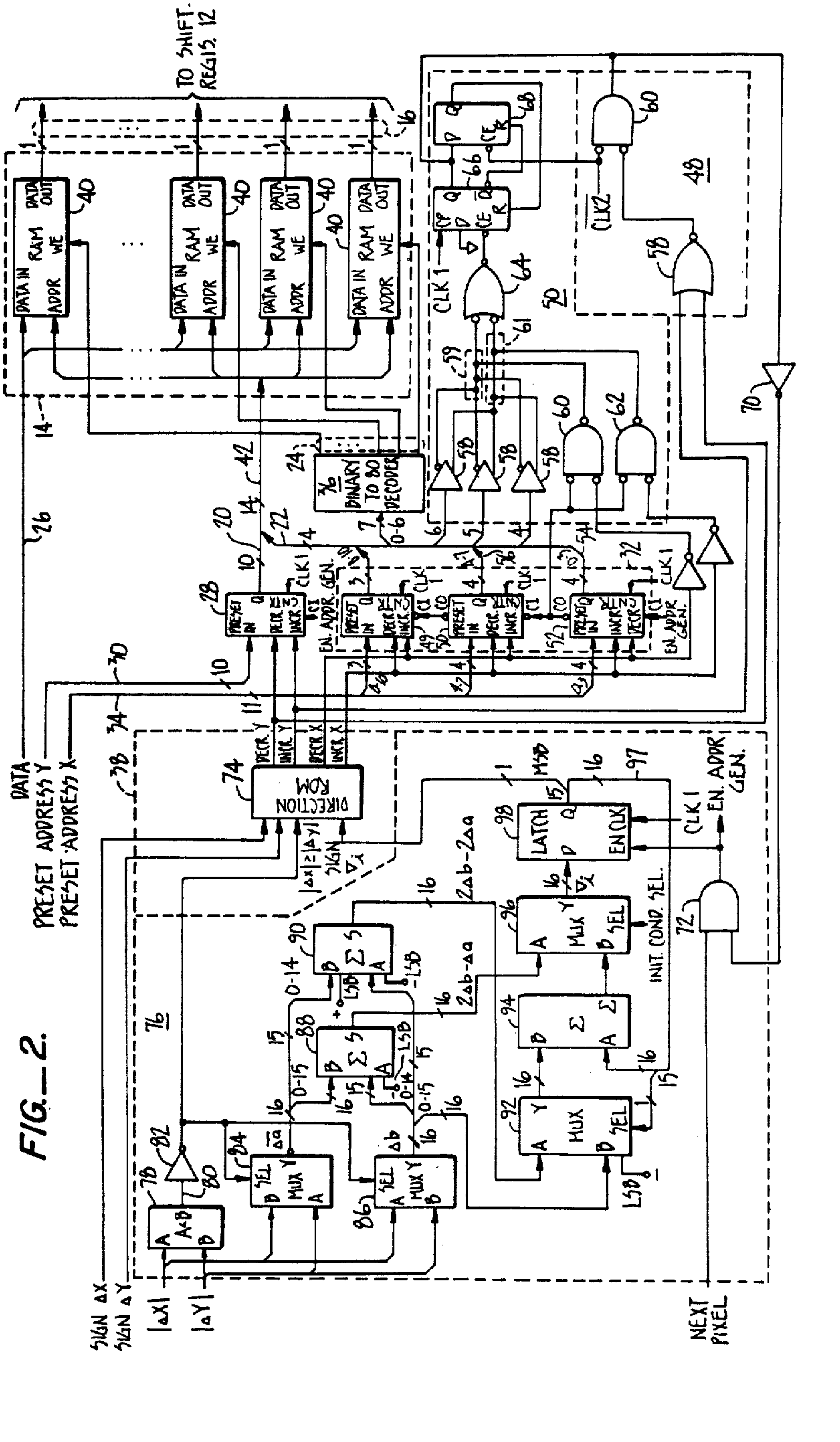
FIG. 2 is a more detailed functional block diagram of the present invention.
Figure 3:
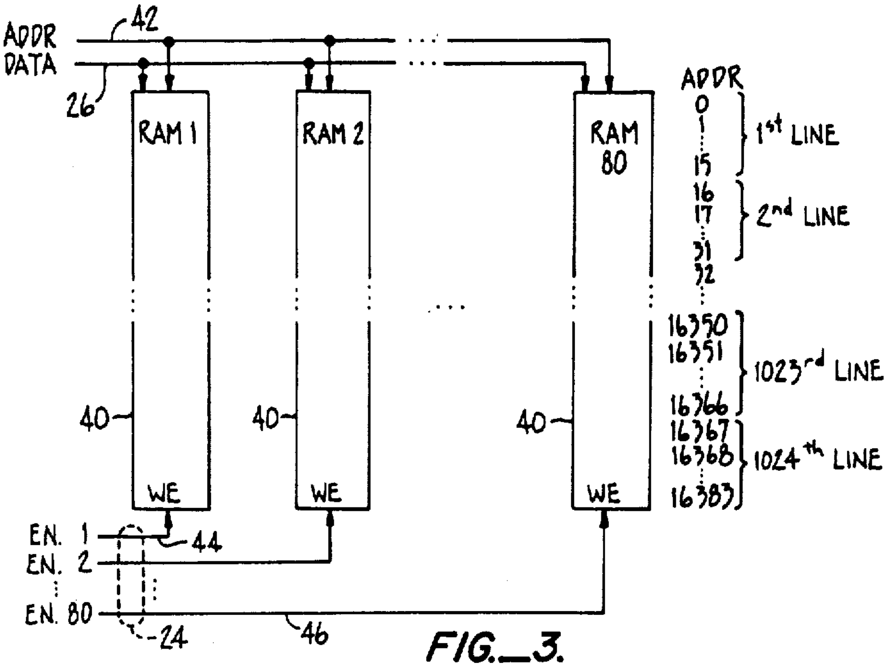
FIG. 3 illustrates the arrangement of storage sites in the screen refresh RAM.

Referring to FIGS. 2 and 3, the configuration of the screen refresh RAM 14 will now be discussed in greater detail. In FIG. 2, it can be seen that the screen refresh RAM 14 comprises a plurality of RAMs 40. Each of these RAMs 40 receives, in common, the data from line 26 and addresses on line 42, it being understood that line 42 is comprised of Y address bus 20 and X address bus 22. Each of the RAMs 40 receives a write enable signal from separate write enable lines 24. Each of the RAMs 40 output data on separate lines 16. In the preferred embodiment of the present invention, there are 80 such RAMs 40, and each of the RAMs is a 16K×1 static RAM. These static RAMs are commercially available, such as part number IMS-1400 manufactured by Inmos, Inc. of Colorado Springs, Col.

FIG. 3 illustrates the organization of the storage sites in the plurality of RAMs 40 which is provided by the structure shown in FIG. 2. With 80 RAMs of 16K×1 storage sites, each address supplied to RAM 14 addresses a block of 80 storage sites. For example, for address 1, the storage site corresponding to address 1 in each of the 80 RAMs will be accessed; for address 16,383, the storage site in each RAM corresponding to address 16,383 will be accessed. Thus, the structure shown in FIGS. 2 and 3 provide 16,384 blocks of storage sites, with each block containing 80 storage sites.

Data can be written into a particular storage site within an addressed block by providing the appropriate write enable signal on the corresponding write enable line for the RAM within which the site is located. Thus, if the first storage site in the block corresponding to address 15 were desired to be written into, a write enable signal would be supplied to the enable 1 line, line 44, which controls RAM 1. So long as a write enable signal is not applied to any of the remaining RAMs 40, the data on data bus 26 will only be written into the RAM 1 storage site corresponding to address 15. Similary, if data were desired to be written into storage site 80 of the block corresponding to address 15, an appropriate signal would be supplied to enable 80 line, line 46, which controls RAM 80.

Figure 4:
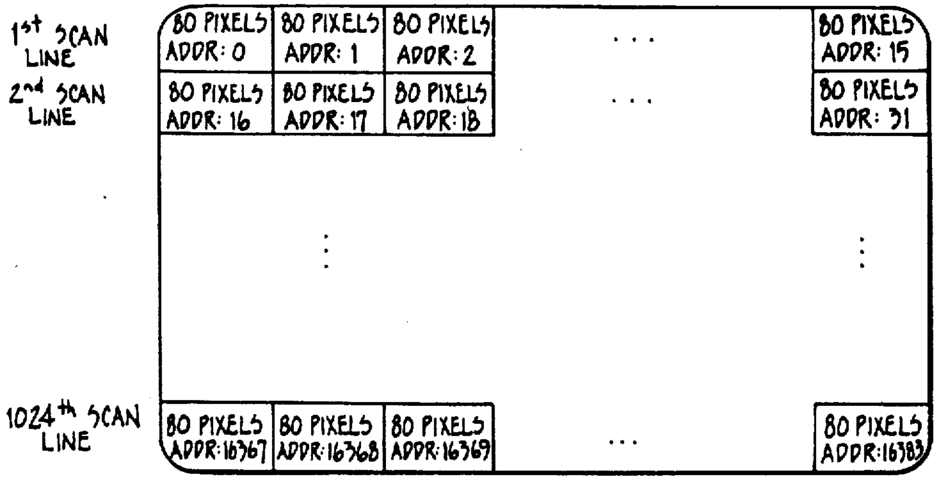
FIG. 4 illustrates the correspondence of the blocks of storage sites to pixel locations on the visual display of a video-graphics system.

FIG. 4 shows the correspondence of the blocks of addressed storage sites to the physical portions of visual display 10. In the preferred embodiment of the present invention, the visual display provides 1280 pixels in the horizontal direction and 1024 pixels in the vertical direction. Thus, for each line of pixels, referred to herein as a scan line, there will be 16 blocks of 80 pixels each. FIG. 4 illustrates the positioning of these blocks with corresponding addresses.

Address Generation

Figure 5:
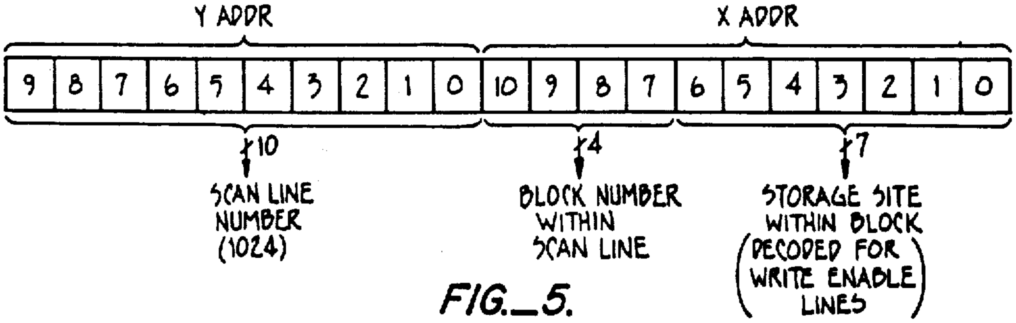
FIG. 5 illustrates the allocation of address information between a Y address, an X address and the allocation of the X address between a block address and write enable information.

Referring to FIG. 2 and FIG. 5, the generation and allocation of the addressing for screen refresh RAM 14 will now be discussed in greater detail. FIG. 5 shows a 21 bit address which is supplied collectively from Y address preset counter 28 and X address preset counter 28. Y address preset counter 28 supplies the ten most significant bits of the collective address while X address preset counter 32 provides the remaining eleven bits of the collective address. The ten most significant bits of the collective address specify the scan line within which the storage site sought to be addressed is located. It can be seen that ten bits of binary address can accomodate the 1024 scan lines which are to be addressed.

In the X address portion of the collective address, the four most significant bits thereof designate the block address within the scan line specified by above-mentioned Y address. Because, for the preferred embodiment of the present invention, there are 16 blocks of storage sites for each scan line, four bits of the X address are allocated to the block-addressing function. The remaining seven bits of the X address portion are allocated to designate individual storage sites within the addressed block. Therefore, in the preferred embodiment to the present invention, seven bits of address are allocated to address the 80 storage sites within a block.

FIG. 2 illustrates the embodiment of the X and Y preset address counters 28 and 32, respecitvely. Y address preset counter 28 can be implemented using binary counters such as part number 10136 manufactured by Motorola, Inc. of Phoenix, Arz. The starting point of the vector to be generated, i.e., the scan line containing the storage site which corresponds to the starting point of the vector, is preset into Y address preset counter 28 via line 30. Depending upon the commands received from vector generator 38, Y address preset counter 28 will increment or decrement the preset Y address at a rate determined by clock signal CLK1 supplied to the clock input thereof.

X address preset counter 32 can be implemented using a combination of binary preset counters, such as part number 10136, referred to above, and decade counter part number 10137, manufactured by Motorola, Inc. of Phoenix, Arz. As shown in FIG. 2, preset counters 49 and 50 are binary counters, while preset counter 52 is a decade counter. Preset counter 49 receives the three most significant bits of the preset address X supplied on line 34, while preset counter 50 receives the next four most significant bits. Preset decade counter 52 receives the four least significant bits of preset address X supplied on line 34. Each of preset counters 49, 50 and 52 increment or decrement their count at a rate determined by clock CLK1. Preset counter 52 is enabled by an enable signal supplied to its CI input. Preset counter 52 counts from zero to ten, in binary, and upon reaching a count of 10, provides a carry signal at its CO output. The output count is supplied from the Q output of the preset counter 52 on line 54. The carry output from preset counter 52 is applied to the CI input of preset counter 50. Thus, each time preset counter 52 reaches a count of 10, preset counter 50 will be enabled to count for a period corresponding to the duration of the carry signal from preset counter 52.

Preset counter 50 is a full binary counter which counts from 0 to 16 in binary, the actual count is supplied from the Q output thereof, on line 56. When a count of 16 is reached, preset counter 50 supplies a carry signal at its CO output. This signal is applied to the CI input of preset counter 49. Thus, preset counter 49 is enabled to count for a time period corresponding to the carry output from preset counter 50.

The above configuration provides, for the seven least significant bits of the generated address, a form of binary-coded decimal address.

It is to be understood that the above binary-coded decimal addressing is provided so that the 80 storage sites within each block of storage sites can be designated by the address being generated. It is to be understood that the form of addressing for the least significant bits of the address from X preset counter 32 will vary depending upon the number of storage sites within a block of storage sites. Thus, if a block contains 64 storage sites, a full binary format and a pair of 16-bit binary counters can be utilized.

The six least significant bits from X address preset counter 32 are supplied to BCD-to-80 decoder 36. From the BCD address information, decoder 36 selects one of its 80 output lines to enable the RAM 40 which contains the storage site specified in the BCD address data. It is to be understood that if the arrangement of screen refresh RAM 14 permits the use of pure binary addressing of the storage sites within an addressed block decoder 36 would be a binary-to-N decoder, where N corresponds to the number of storage sites within a block.

Boundary Detection

As discussed above, in connection with FIG. 1, a Y boundary detection circuit 48 and an X boundary detection circuit 50 are provided to permit a look-ahead function. The Y boundary detector 48 is shown in the bottom righthand corner of FIG. 2. The Y boundary detector 48 monitors the decrement Y or increment Y control signals from vector generator 38. Because, as discussed above, the Y address portion of the collective address supplied to screen refresh RAM 14 specifies the scan line containing the storage site into which the data are to be written, any change in the Y address count can be interpreted as a movement from one block of storage sites to another block of storage sites, hence requiring a RAM access.

The inputs of NOR gate 58 are connected to the decrement Y and increment Y lines from vector generator 38. Whenever a command signal is present on these lines, NOR gate 58 will supply a logic zero signal to AND gate 60. The other input to AND gate 60 is supplied from a second clock $\overline{CLK2}$. Typically, the $\overline{CLK2}$ signal will have a repetition rate which is comparable to the access rate for screen RAM 14.

As discussed above, the present invention exploits the shorter time period typically required for the write enable signal into a random access memory. Recall that, during a write operation, data, an address and a write enable signal are required to be supplied to the random access memory. The typical requirement is that the address and data be applied to the random access memory for a predetermined length of time before a valid write operation can be accomplished. This predetermined length of time permits the signals on the data and address lines to settle into a steady state condition as well as permits the random access memory itself to respond to the information on the data and address lines. Thereafter, the write enable signal is applied which has a shorter duration than the time period required for the address and data. Thus, by requiring that address signals be changed only periodically, and by controlling the actual writing of data into the random access memory by appropriate application of write enable signals to appropriate write enable lines of the random access memory, a larger proportion of the write operation will involve use of the write enable signal, as opposed to the longer RAM access time period.

The vector generator 38 will thus operate more often at the higher speed write enable rate, and will slow its operation only when a new block of storage sites is to be addressed.

As discussed above, the X and Y boundary detection circuits 48 and 50, respectively, detect the condition wherein a new block of storage sites is to be addressed. In FIG. 2, X boundary detection circuitry 50 is shown to receive information from the decrement X and increment X lines of vector generator 38, bits 4 through 6 from X address preset counter 32, and the carry output from decade preset counter 52.

As discussed above, decade preset counter 52 provides a carry signal at its output whenever its count is incremented to a count of 10, or decremented to a count of 0. Bits 4 through 6 from the X address preset counter 32 correspond to the tens place of the binary coded decimal address which is supplied to BCD to 80 decoder 36. These bits are received by buffers 58 which, in turn, provide an inverted and a noninverted output representative of the state of the applied bits.

In the embodiment of the invention shown in FIG. 2, emitter coupled logic circuitry is utilized. As such, the outputs of buffers 58 can be tied together as shown in FIG. 2 to form "wired ORs". As can be seen from the figure, the inverted outputs from buffers 58 are tied together and the noninverted outputs of buffers 58 are tied together. Also forming a part of the "wired OR" 59 of the inverted outputs from buffers 58 is the output from inverted input NAND gate 60. Inverted input NAND gate 60 receives, as one of its inputs, the carry signal from preset counter 52. The other input to NAND gate 60 is supplied from the decrement X signal originating from vector generator 38.

Also forming a part of the "wired OR" 61 of the noninverted outputs of buffers 58 is the output from inverted input NAND gate 62. One input to NAND gate 62 is supplied from the carry output of preset counter 52, while the other input is supplied from the increment X line, originating from vector generator 38. The "wired OR" 59 is connected to one input of inverted input NOR gate 64. The other input of NOR gate 64 is supplied from the "wired OR" 61.

Whenever bits 4 through 6 of the output of X address preset counter 32 are all in a logic one state, and there is a carry signal from preset counter 52, and there is an increment X signal from vector generator 38, the "wired OR" 59 provides a zero logic level to NOR gate 64. In turn, NOR gate 64 provides a logic zero level to the CE or chip enable input of D flipflop 66. The output of D flipflop 66 assumes a logic one state in synchronism with the CLK1 signal applied to the CP input to D flipflop 66. The output of D flipflop 66 can be seen to be connected to the D input of flipflop 68, as well as to the vector generator 38 via inverter 70. Note also that the output from Y boundary detector circuitry 48 is connected in a "wired OR" configuration to the output of X boundary detection circuit 50.

The output of inverter 70 is received by NAND gate 72. The other input to NAND gate 72 is the "next pixel" signal from the system processor. Typically, when the vector generator function is operable, the "next pixel" signal will be in a logic one condition. When the logic zero level is received by AND gate 72 from inverter 70, a logic zero level will be applied to the enable port of vector generator 38, as well as to the enable inputs of Y address preset counter 28 and X address preset counter 32. This halts the operation of the vector generator and the preset counters 28 and 32. When the logic zero level from inverter 70 is removed, the operation of vector generator 38 and the preset counters 28 and 32 are permitted to resume.

In FIG. 2, the chip enable input to D flipflop 68 is shown connected to the CLK2 signal. As discussed the $\overline{CLK2}$ signal has a period which corresponds to the required RAM access time period. When the $\overline{CLK2}$ period is over, as evidenced by a falling edge, for example, D flipflop 68 will receive at its D input the logic one state output then being provided by D flipflop 66. Upon receiving this logic one state, D flipflop 68 will provide at its output a logic one signal. This logic one signal, in turn, is supplied to the reset input of D flipflop 66. This causes the output of D flipflop 66 to be reset to a logic zero level. This logic zero level, from the output of D flipflop 66, is converted to a logic one level by inverter 70 which, in turn, is supplied to NAND gate 72. As a result, the output of AND gate 72 assumes a logic one level which, in turn, enables the operation of vector generator 38 and preset counters 28 and 32. Thus, the time during which the vector generator 38 and preset counters 28 and 32 are disabled corresponds to the required RAM access time.

As can be seen from FIG. 2, whenever NOR gate 58 detects a change in the decrement Y or increment Y signals from vector generator 38, it supplies a logic zero level to inverted input AND gate 60. When the $\overline{CLK2}$ signal, which is supplied to the other input of NAND gate 60 assumes a logic zero level, AND gate 60 applies a logic one level to inverter 70. Inverter 70, thereafter, applies a logic zero level to NAND gate 72, thereby disabling vector generator 38 and preset counters 28 and 32. When $\overline{CLK2}$ returns to a logic one level, the output of AND gate 60 returns to a logic zero level, which in turn causes a logic one level to be output from inverter 70. This causes NAND gate 72 to enable the operation of vector generator 38 and preset counters 28 and 32. In this manner, the addresses being generated and applied to screen refresh RAM 14 are maintained at their then existing state for a period of time determined by the period of the $\overline{CLK2}$ signal. The $\overline{CLK2}$ signal is preferably adjusted to correspond to the amount of time required by the screen refresh RAM for access purposes.

For the circuitry shown in FIG. 2, X boundary detection circuity 50 determines when the address, supplied by X address preset counter 32, is addressing the low end or high end of a block of storage sites. Thus, when X address preset counter 32 outputs an address of 79 when in the incrementing mode, or an address of zero when in the decrementing mode, X boundary detection circuit 50 will supply the appropriate disable signal via inverter 70 to the vector generator 38. In the case of storage site 79, bits 4 through 6, received by buffers 58, will be all ones, corresponding to a seven in the tens place of the address. Additionally, preset counter 52 will provide a carry signal at its CO output, indicating that a count of 10 has been reached. The carry signal is received by NAND gate 62, along with the inverted signal on the increment X line from vector generator 38. When all of the above-discussed signals are present, signifying a next address of 80, the "wired OR" 61 will provide a logic zero to NOR gate 64. As discussed above, D flipflops 66 and 68 will then generate the appropriate disable signal with the appropriate pulse-width.

Similarly, when the X address preset counter 32 is being decremented, decade preset counter 52 will supply a carry signal at its CO output, when a zero count is reached. This carry output is supplied to NAND gate 60, along with the inverted-decrement X signal from vector generator 38. Additionally, bits 4 through 6 will all be at a logic zero state. Buffers 58 will apply these logic zero states to the "wired OR" 59. When these conditions are met, the "wired OR" 59 will provide a logic zero signal to NOR gate 64 which, in turn, causes D flipflops 66 and 68 to supply the appropriate disable signal to vector generator 38 and preset counters 28 and 32.

Vector Generator

One embodiment of a vector generator which can be used in the present invention is shown in the lefthand portion of FIG. 2. As discussed above, the vector generator receives magnitude data for the amount of change desired in the X and the Y coordinate directions, as well as the direction of change. The vector generator shown in FIG. 2 implements what is known as the Bresenham vector generation algorithm. This algorithm is well known in the art and is discussed in a paper published in the IBM Journal, Vol. 4, No. 1 pages 25-30, 1965. The Bresenham algorithm provides an optimal sequence of addresses by which a vector can be written into a bit-map type memory which vector connects a starting point to an ending point. As is the case in most digital display systems, in order to display a line which is angled from the horizontal or vertical dimension of the display, such angled line is required to be constructed from a sequence of short horizontal and vertical line segments. When the resolution of the visual display is high enough, these connected line segments appear to the viewer as the desired angled line. The Bresenham algorithm provides a method for specifying the number, placement and interconnection of these horizontal and vertical line segments using only addition or subtraction operations.

In operation, the Bresenham algorithm divides the plane in which the vector lies into octants which are referenced to the starting point of the vector, and then determines in which octant the vector is positioned. An octant corresponds to a pie-shaped segment subtending a 45° angle. For a vector lying in a given octant, the Bresenham algorithm then specifies whether the next pixel of information to be written should be in the storage site wherein only one coordinate of the address is incremented/decremented, or both coordinates of the address are incremented/decremented.

Figures 6A, 6B:
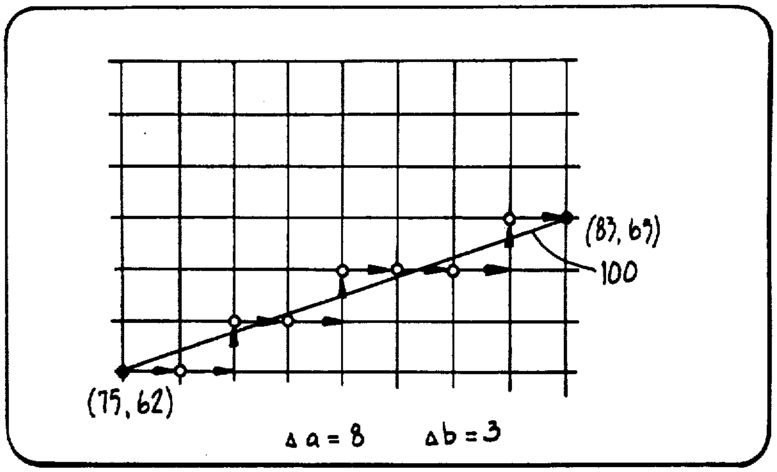
FIG. 6 is an example of the operation of the present invention.

As an example, see FIG. 6, wherein a vector is generated from a starting point corresponding to an XY address of (75, 62) and ends at an ending XY address of (83, 65). Each circle represents the location of a pixel which is to be written. As can be seen from the upper portion of the figure and indicated by the arrows and circles lying along the grid, the Bresenham algorithm provides the increment and decrement control signals by which the addresses generated and supplied to the screen refresh RAM 14 are made to correspond to the circles shown in the figure. Thus, in the first subsequent address from the starting point, the Bresenham algorithm would specify that only the X address be incremented. For the next pixel address, the Bresenham algorithm specifies that both the X and the Y address be incremented. In FIG. 6, the example illustrates the Bresenham algorithm for a vector located in the first octant. For other octants and directions, the address changes specified by the Bresenham algorithm are provided in Table 1.

As can be seen from Table 1, the octant in which the vector lies can be determined by the sign of the change in the X direction, the sign of the change in the Y direction, and whether the magnitude of the change in the X direction is greater than the magnitude of the change in the Y direction. Thus, for example, if the sign of the X change is positive, the sign of the Y change is negative, and the magnitude of the X change is greater than the magnitude of the Y change, the vector is indicated as being located in octant number 7.

TABLE 1

| Sign X | Sign Y | Mag X greater Mag Y | Octant | Sign of Gradient | Incr X | Decr X | Incr Y | Decr Y |
|---|---|---|---|---|---|---|---|---|
| + | + | Yes | 0 | − | 1 | 0 | 0 | 0 |
| + | + | Yes | 0 | + | 1 | 0 | 1 | 0 |
| + | + | No | 1 | − | 0 | 0 | 1 | 0 |
| + | + | No | 1 | + | 1 | 0 | 1 | 0 |
| − | + | No | 2 | − | 0 | 0 | 1 | 0 |
| − | + | No | 2 | + | 0 | 1 | 1 | 0 |
| − | + | Yes | 3 | − | 0 | 1 | 0 | 0 |
| − | + | Yes | 3 | + | 0 | 1 | 1 | 0 |
| − | − | Yes | 4 | − | 0 | 1 | 0 | 0 |
| − | − | Yes | 4 | + | 0 | 1 | 0 | 1 |
| − | − | No | 5 | − | 0 | 0 | 0 | 1 |
| − | − | No | 5 | + | 0 | 1 | 0 | 1 |
| + | − | No | 6 | − | 0 | 0 | 0 | 1 |
| + | − | No | 6 | + | 1 | 0 | 0 | 1 |
| + | − | Yes | 7 | − | 1 | 0 | 0 | 0 |
| + | − | Yes | 7 | + | 1 | 0 | 0 | 1 |

Also shown Table 1 are the increment decrement commands supplied by the vector generator 38 as a function of the octant in which the vector is located, and the sign of a number called the gradient. This gradient is determined by the following equations:

$$\nabla 1 = 2\Delta b - \Delta a \quad (1)$$

$$\nabla i + 1 = \begin{cases} \nabla i + 2\Delta b - 2\Delta a, & \text{if } \nabla i \geqq 0 \\ \nabla i + 2\Delta b, & \text{if } \nabla i < 0 \end{cases} \quad (2)$$

where the values of delta a and delta b are equal to the magnitude of the change in the X direction or the change in the Y direction, depending upon the octant in which the vector lies. Thus, if the vector lies in octant 0, delta a will be equal to the magnitude of the change in the X direction, while delta b will be equal the magnitude of the change in the Y direction. Conversely, if the vector were in octant number 5, delta a will be equal to the magnitude of the change in the Y direction, while delta b will be equal to the magnitude of the change in the X direction. Given the assignment of values for delta a and delta b, equations 1 and 2 are utilized to determine the value of the gradient of the address for the next pixel; i.e., pixel i+1, see equation (2). Equation (1) provides the value of the gradient for the starting point of the vector.

From equation (2), the sign of the gradient for pixel i+1 is used along with the octant location of the vector in order to designate whether the XY addresses will be incremented or decremented. This can be seen in the six right-most columns of Table 1. Thus, if the vector lies in octant 3 and the sign of the gradient is negative, the X address will be decremented while the Y address will be incremented. Similarly, if the vector lies in octant 6, and the sign of the gradient is negative, only the Y address will be changed, in this case decremented.

Referring to FIG. 2, direction ROM implements the contents of Table 1. Direction ROM 74 receives the sign of the change in the X direction, the sign of the change in the Y direction, an indication whether the magnitude of the X direction change is greater than or equal to the magnitude of the Y direction change, and the sign of the gradient. The determination of the octant within which the vector lies is accounted for in the arrangement of the contents of direction ROM 74 in relation to the values of the sign of the X change, the sign of the Y change, the sign of the gradient, and the relative magnitude of the X and Y change.

As can be seen from Table 2 and from Table 1, the values for delta a and delta b can be assigned according to whether the change in the X direction is greater than or equal to the change in the Y direction or is less than the change in the Y direction. If the change in the X direction is greater than the change in the Y direction, then delta a would be assigned the change in the X direction quantity while delta b would be assigned the change in the Y direction quantity. Conversely, if the change in the X direction is less than the change in the Y direction, delta a would be assigned the change in the Y direction quantity while delta b would be assigned the change in the X direction quantity. The relative magnitude determination and the assignment of the delta a and delta b quantities are performed within the gradient determination circuitry 76. Gradient circuitry 76 implements equations (1) and (2).

TABLE 2

| OCTANT | $\Delta a = \lvert\Delta\_\rvert$ | $\Delta b = \lvert\Delta\_\rvert$ |
|---|---|---|
| 0 | X | Y |
| 1 | Y | X |
| 2 | Y | X |
| 3 | X | Y |
| 4 | X | Y |
| 5 | Y | X |
| 6 | Y | X |
| 7 | X | Y |

Within gradient circuitry 76, comparator 76 receives the magnitude of the X change and magnitude of the Y change and provides an indication at its output as to whether the change in the X direction is less than the change in the Y direction. This indication is inverted by inverter 82 to provide an indication as to whether the change in the X direction is greater than or equal to the change in the Y direction. This indication is supplied to direction ROM 74 and to the select inputs of multiplexers 84 and 86. Multiplexer 84 receives the change in the Y direction quantity as its first input and the change in the X direction quantity as its second input. Conversely, multiplexer 86 receives the change in the X direction as its first input and the change in the Y direction quantity as its second input. As such, when the change in the X direction quantity is larger than the change in the Y direction quantity multiplexer 84 will provide at its output the change in the Y direction quantity, while multiplexer 86 will provide at its output the change in the X direction quantity. Conversely, when the change in the X direction quantity is less than the change in the Y direction quantity, multiplexer 84 will supply the X direction quantity at its output, while multiplexer 86 will provide the Y direction quantity at its output. It should be noted that the inverted output of multiplexer 82 is utilized. This is so a 2's complement subtraction can be used in this implementation.

The inverted output of multiplexer 84 provides the inverted delta a element while the output of multiplexer 86 provides the delta b element of equations (1) and (2). Summer 88 receives the output from multiplexer 84 at one of its inputs, and the output from multiplexer 86, which has been shifted upwards one bit, at its other input to provide an output quantity representative of equation (1). The input received from multiplexer 86 is shifted upwards by one bit, where the added bit is a logic zero, so that the effect of this shift is to multiply the inputted quantity by two. Thus, the output of summer 88 will be two times delta b minus delta a.

Similarly, summer 90 receives the output from multiplexer 84 and shifts this quantity upwards by one bit. Here, because an inverted quantity is being received, the added bit is assigned a logic 1 state. The summer 90 also receives the output from multiplexer 86 and shifts this output upward by one bit, wherein the added bit is a logic zero. As before, this effectively multiplies a quantity by two. Thus, the output of summer 90 is two times delta b minus two times delta a. Multiplexer 92 receives the output from summer 90 at its first input and the output from multiplexer 86 at its second input. The quantity received by multiplexer 92 from multiplexer 86 is shifted upward by one bit, where the added bit is a logic zero, so as to multiply the quantity by two. The output of multiplexer 92 is selected to correspond to the quantity at either the first input or second input, depending upon the sign of the gradient. The sign of the gradient is the most significant bit of the output of gradient circuitry 76.

In the embodiment shown in FIG. 2, wherein 16 bit words are used, the sign of the gradient will be found in the 16th bit. If the sign of the gradient is positive, multiplexer 92 will output the quantity received from summer 90. On the other hand, if gradient is negative, multiplexer 92 will output the quantity, which is then multiplied by two, received from multiplexer 86. The output of multiplexer 92 is added, in summer 94, to the gradient quantity which is fed back from the output of gradient circuitry 76, via line 96. This gradient quantity represents the gradient quantity for the previous iteration, i.e. the gradient for pixel i.

The output from summer 94 thus provides an output which satisfies equation (2) above.

Multiplexer 96 permits the selection of the initial condition described by equation (1) above when the vector generator first begins the generation of a new vector. Thus, multiplexer 96 receives at its first input the output from summer 88 and receives at its second input the output from summer 94. An initial condition select signal is applied to the select input of multiplexer 96 from the system processor 25. Thus, when the vector generator initially begins generation of the new vector, summer 88 will provide at its output a quantity representative of the relationship two times delta b minus delta a. Thereafter, multiplexer 96 will provide an output which corresponds to the output of summer 94.

Latch 98 receives the gradient information from multiplexer 96 and holds this quantity for use in the next iteration. The output of latch 98 is thus provided via line 97 to summer 94 and multiplexer 92. Also, the most significant bit, being the sign bit of the gradient, is supplied to direction ROM 74.

In the above manner, equations (1) and (2) and Tables 1 and 2 above are implemented in the present invention.

Referring to FIG. 6, an example of the operation of the present invention is provided. Shown in the upper portion of FIG. 6 is a portion of the visual display screen. A vector, indicated by reference numeral 100, is desired to be written beginning at XY starting point (75, 62) and ending at XY point (83, 65). Thus, the change in the X direction, which is positive, totals eight units while the change in the Y direction, which is also positive, totals three units. From Table 1, it can be seen that the vector is located in octant zero.

In the lower portion of FIG. 6, the first column corresponds to the gradient; the second column corresponds to the scan line address of the storage site into which the pixel is to be written; the third column corresponds to the address of the block of storage sites within the scan line which contains the pixel to be written into; the fourth column corresponds to the storage site within the addressed block which is to receive the pixel; and the fifth and sixth columns indicate whether an X or a Y boundary has been detected. Shown underneath the column headings are the bit numbers for each of the addresses. The scan line address, in column 2, includes 10 bits. The block address, in column 3, includes 4 bits, while the site address includes 7 bits.

The first set of addresses can be seen to correspond to the XY starting address (75, 62). On the first iteration, the gradient is determined to be a negative 2. From Table 1, it can be seen that in octant zero, whenever the sign of the gradient is negative, only the X address will be incremented. Thus, in the top portion of FIG. 6, it can be seen that, for the first iteration, only the X address is incremented. Thus, in column 4, the site address is seen to be increased by one. At this point, the pixel being written into is still within storage block 0000.

For the next iteration, the gradient is determined to be a positive 4. From Table 1, it can be seen that for octant zero, and a positive gradient, both the X and Y addresses are to be incremented. Thus, from the top of FIG. 6 it can be seen that the next pixel is written into a location wherein both the X and Y addresses have been incremented. This is reflected in the second and fourth columns of FIG. 6. Also, as discussed above, the boundary-detect circuitry 48 provides a signal to vector generator 38 whenever a change in the Y address or column address as detected. This indication causes the vector generator 38 to slow its operation for a short period of time so that the addresses supplied by the vector generator to RAM 14 are presented thereto long enough to satisfy the RAM access time requirements. Thus, in FIG. 6, column 6, a logic 1 is provided at the boundary-detect output to indicate that a Y boundary has been detected.

Referring to the fourth and fifth iterations in FIG. 6 and specifically column 4, it can be seen that between the fourth and fifth iterations, the site being addressed crosses the block boundary i.e., moves from address 79 in block 0000 to address 1 in block 0001. In column 5, it can be seen that a logic 1 is provided to indicate that a block boundary transition has been detected. Recall from the discussion above that the addressing within the storage sites within a block are in binary coded decimal form. Thus, the four least significant bits are a binary representation of a decimal count while the three most significant bits are a pure binary count. Thus, in the fourth iteration, the four least significant bits have a 1001 logic state, corresponding to a decimal 9, and the three most significant bits have a 111 state corresponding to a decimal 7. On the next iteration, the X address is incremented, in accordance with Table 1, and the storage site addresses make a transition from the 79th storage site in block 0000 to the first storage site in block 0001. As discussed above, a boundary indication from boundary detector 50 causes the vector generator to slow its operation for a short period so that the RAM 14 has enough time to accept the new address from vector generator 38. Recall that bits 0 through 9 of the scan line address in FIG. 6 and bits 7 through 10 of the X address in FIG. 6 are supplied to the address inputs of RAM 14. Also recall that the storage site address in Column 4 of FIG. 6 is supplied to a BCD decoder circuit 36, which in turn provides chip enable signals to the individual random access memories within RAM 14. Thus, so long as the only changes in the addressing provided from vector generator 38 are in the storage site addressing of column 4, corresponding to the enable signals to RAM 14, the vector generator 38 can operate at high speed. However, whenever there is a change in the scan line address, column 2, FIG. 6, or the X address, Col. 3, FIG. 6, the vector generator 38 is slowed for a short period to permit the new address to be accepted by RAM 14.

In the above manner, the vector generator 38 and RAM 14 can be operated at high speed when no new addressing is required to be made and slowed down only when a new address is sought to be applied to RAM 14. Additionally, once the new address has been supplied to RAM 14, the vector generator 38 and RAM 14 can again be operated at the higher speed.

The circuitry of vector generator 38 can be implemented by commercially available parts. Suitable commercial part numbers for the various functional blocks shown in FIG. 2 are provided in Table 3.

TABLE 3

| Functional Block | Commercial Part No. | Manufacturer |
|---|---|---|
| Comparator 78 | 74LS85 | Signetics Corp., Sunnyvale, CA |
| Multiplexer 84 | 74LS158 | Signetics Corp., Sunnyvale, CA |
| Multiplexer 86 | 74LS157 | Signetics Corp., Sunnyvale, CA |
| Summer 88, 90 | 74LS283 | Signetics Corp., Sunnyvale, CA |
| Multiplexer 92, 96 | 100155 | Motorola, Inc., Phoenix, AZ |
| Summer 94 | 100180 | Motorola, Inc., Phoenix, AZ |
| Latch 98 | 100141 | Motorola, Inc., Phoenix, AZ |

The terms and expressions which have been employed here are used as terms of description and not of limitation, and there is no intention, in the use of such terms and expressions of excluding equivalents of the features shown and described, or portions thereof, it being recognized that various modifications are possible within the scope of the invention claimed.

What is claimed is:

1. An apparatus for high speed storage of data at designated locations within an array of locations in memory comprising memory means having a plurality of storage sites for storing the data, wherein each storage site corresponds to a different one of the locations in the array of locations, and wherein the storage sites are addressable in blocks of storage sites, each block having a unique address, and further wherein each storage site within a an addressed block of storage sites can be individually enabled to store data when that block of storage sites is being addressed, wherein the memory means responds at a memory write access rate to an addressing of a block of storage sites for writing data therein, and responds at a write enable rate to an enabling of a storage site for writing data therein, the write enable rate being greater than the memory write access rate;

address generator means coupled to the memory means for addressing blocks of storage sites which contain the designated locations and for enabling storage sites within the addressed blocks which correspond to the designated locations, wherein the address generator means are controllable to enable the storage sites at a rate of operation corresponding to either the memory write access rate or the write enable rate; and control means coupled to the address generator means for controlling the rate of operation of the address generator means, wherein the control means controls the address generator means to operate at the memory write access rate for a predetermined period of time whenever the address generator means addresses a new block of storage sites, and controls the address generator means to operate at the write enable rate whenever the address generator means enables storage sites within a block of storage sites which is currently being addressed, so that the data are stored in the memory means at the highest rate at which the memory means is capable of responding.

2. The apparatus of claim 1, wherein the address generator means comprise addressing means for generating addresses for the designated locations into which the data are to be stored, wherein the addressing means operates at the rate of operation selected by the control means; and means responsive to the designated location addresses for interpreting each designated location address so as to provide the address of the block in which is located the storage site corresponding to the designated location address and to designate the storage site within the block which is to be enabled.

3. The apparatus of claim 2, wherein the addressing means include a vector address generator which implements a Bresenham vector generator algorithm.

4. The apparatus of claim 1, wherein the memory means include a plurality of random access memories, each of which has a data line and a write enable line, and each of which contains a plurality of addressable storage sites for storing data provided on the data line upon receipt of an address and a write enable signal, and further wherein data and addresses are provided to the plurality of random access memories in common but write enable signals are applied individually, so that for each address applied to the plurality of random access memories a single storage site in each of the plurality of random access memories is addressed, and the addressed storage sites from each of the plurality of random access memories form the block of storage sites corresponding to the applied address, and so that data are written into only those addressed storage sites located in the ones of the plurality of random access memories which also received a write enable signal.

5. The apparatus of claim 1, wherein the memory means stores data for display on a raster scanning display so that the data are arranged in the memory means according to scan lines and the data corresponding to each scan line are stored in a plurality of blocks of storage sites, and wherein each address provided by the address generator means includes a scan line address, an address of a block within the addressed scan line, and a designation of the storage site within the addressed block which is to receive the data, and further wherein the control means is responsive to the scan line address and to the storage site designation such that the control means selects the memory write access rate of operation for the address generator means whenever a new scan line address or a storage site at either end of the addressed block are specified, and such that the control means selects the write enable rate of operation for the address generator means whenever a storage site within the addressed block is specified.

6. The apparatus of claim 2, wherein the addressing means operates at the write enable rate and is responsive to a delay signal so that upon receipt of a delay signal the addressing means delays operation for a period of time corresponding to the length of the delay signal, and further wherein the control means controls the address generator means to operate at the memory write access rate by applying the delay signal to the addressing means, which delay signal has a length in time which corresponds to the memory write access rate.

7. The apparatus of claim 1, wherein the memory means stores data for display on a raster scanning display so that the data stored therein are arranged according to scan lines in which data corresponding to each scan line are stored in a plurality of blocks of storage sites, and wherein address information including starting address parameters and displacement parameters, are received from a user, and further wherein the address generator means comprise vector generator means responsive to the displacement parameters for generating vector control signals at the write enable rate including an increment/decrement scan line signal for addressing different scan lines, and an increment decrement storage site signal for addressing different storage sites in a scan line; and presettable counter means responsive to the starting address parameters, the increment/decrement scan line signal, and the increment/decrement storage site signal, for providing the scan line address, the block address and for enabling the storage sites, wherein the presettable counter means modifies the starting address parameters in accordance with the increment/decrement scan line signal and the increment/decrement storage site signal to provide the scan line address, the block address and to enable the storage sites.

8. The apparatus of claim 7, wherein each block of storage sites has boundaries located at the first storage site and the last storage site in the block, and further wherein the control means comprise means coupled to the vector generator means for detecting the presence of the increment/decrement scan line signal, including first means for generating a first delay signal whenever the presence of the increcent/decrement scan line signal is detected;

means coupled to the presettable counter means for determining when a storage site which is located at the boundary of a block is being enabled, including means for generating a second delay signal whenever a storage site located at the boundary of a block is being enabled, wherein the vector generator means are responsive to the first and second delay signals such that the vector generator means operates at the memory write access rate whenever the first or second delay signals are generated.

* * * * *